United States Patent [19]

Nagai et al.

[11] Patent Number: 4,686,754

[45] Date of Patent: Aug. 18, 1987

[54] METHOD FOR MANUFACTURING A HEAT INSULATING SHAPED BAR

[75] Inventors: Yoshitaka Nagai; Nobushige Doguchi, both of Toyama, Japan

[73] Assignee: Yoshida Kogyo K. K., Tokyo, Japan

[21] Appl. No.: 623,171

[22] Filed: Jun. 22, 1984

[30] Foreign Application Priority Data

Jun. 30, 1983 [JP] Japan ................................ 58-116912

[51] Int. Cl.[4] ................................................ B23P 17/00

[52] U.S. Cl. ........................................................ 29/418

[58] Field of Search .................. 29/418, 527.1, 155 R; 52/403, 729, 730, 731, 732; 49/DIG. 1

[56] References Cited

U.S. PATENT DOCUMENTS 3,992,769 11/1976 Jackson ................................ 29/418
4,128,934 12/1978 Doring ................................. 29/418
4,185,439 1/1980 Bischlipp ............................... 29/418
4,330,919 5/1982 Bischlipp et al. ...................... 29/418
4,342,144 8/1982 Doguchi .............................. 29/418

FOREIGN PATENT DOCUMENTS 2091329 7/1982 United Kingdom .
2098890 12/1982 United Kingdom .

*Primary Examiner*—Howard N. Goldberg
*Assistant Examiner*—Steven Nichols

[57] ABSTRACT

A method for manufacturing a heat insulating shaped bar including a pair of spaced side walls and a heat insulating connecting portion formed by heat insulating material and connecting the pair of side walls together from an integrally extruded metal shaped bar having the pair of side walls and a connecting wall (or walls) extending and connecting between the side walls is disclosed. The connecting wall(s) includes on one surface thereof a recess having sloped sides and extending longitudinally of the metal shaped bar and the method includes a step of cutting the material of the connecting wall(s) from the other surface at the area of the recess.

2 Claims, 35 Drawing Figures

METHOD FOR MANUFACTURING A HEAT INSULATING SHAPED BAR

BACKGROUND OF THE INVENTION

This invention relates to a method for manufacturing a heat insulating shaped bar for such use as a heat insulating sash frame, door frame and the like and particularly to a method which uses a shaped bar including a connecting wall (or walls) which forms the top, bottom or intermediate wall connecting a pair of spaced side walls of the shaped bar and has such a shape that any scrap produced during the cutting operation of the connecting wall(s) in the manufacturing of the shaped bar will not remain in a cavity of the shaped bar product.

Processes have been known for manufacturing a heat insulating shaped bar by filling grooves formed in an aluminum sash bar with heat insulating material. One example of such processes is disclosed, for example, in U.S. Pat. No. 4,342,144 and it will be now described referring to FIG. 1 which shows the successive steps in the process in cross section. An aluminum sash bar 1 having an upwardly open groove 2 as shown in FIG. 1(*a*) is provided, a sheet 3 is placed onto the bottom of the upper groove 2 as shown in FIG. 1(*b*), and the upper groove 2 is filled with heat insulating material 4 to cover the sheet 3 as shown in FIG. 1(*c*). Thereafter, the rotary cutting blade 6 of a cutting device is inserted into the lower groove 2' in the sash bar 1 to cut away a portion of connecting wall 5 as shown in Fig. 1(*d*). The thus obtained intermediate product is turned upside-down so that the groove 2' is disposed on the top and a sheet 3' is placed onto the open bottom 5 of the now upper groove 2' as shown in FIG. 1(*e*). Finally, the groove 2' is filled with heat insulating material 4' to cover the sheet 3' in order to obtain a heat insulating aluminum sash bar product as shown in FIG. 1(*f*).

In the conventional process described hereinabove, however, when the connecting wall 5 is cut by the rotary cutter blade 6 as shown in FIG. 1(*d*), in fact, the connecting wall 5 is not completely cut away, since the connecting wall 5 is first cut and separated at both side edges of the rotary cutter blade 6, as shown in FIG. 2, which produces a scrap 7 separated from the rest of the wall 5. As shown in FIGS. 3 and 4, the scrap 7 is thrown away from the cutter blade 6 into the cavity of the sash bar 1 where the scrap 7 is left in the form of a web without being subject to further cutting. If the scrap 7 in the form of a web which has a high thermal conductivity remains in the sash bar 1, even after the connecting wall 5 has been cut and the sash bar has been filled with heat insulating material, the obtained aluminum sash bar product will have undesirably poor heat insulating properties. Thus, the conventional process requires an additional step for removing the scrap. In addition, since the produced scrap not only has sharp fins formed at the opposite edges thereof, but is irregularly deformed, the removal of the scrap is troublesome. The generation of the scrap has been one of the problems inherent to the conventional process.

It is, therefore, a primary object of the present invention to provide a method for manufacturing heat insulating shaped bars which can prevent production of scrap in the form of a web during the cutting operation of the connecting wall.

The present invention may be summarized as a method for manufacturing a heat insulating shaped bar including a pair of spaced side walls and a heat insulating connecting portion formed by heat insulating material and connecting the pair of side walls together from an integrally extruded metal shaped bar having the pair of side walls and a connecting wall (or walls) extending and connecting between the side walls; wherein the connecting wall(s) includes on one surface thereof a recess having sloped sides and extending longitudinally of the metal shaped bar and whereby the method includes a step of cutting the material of the connecting wall(s) from the other surface at the area of the recess.

In the method of this invention, since the gap which separates the connecting wall into two wall sections is formed at the thinned recessed portion at first and is then widened toward the thicker sloped side portions, no scrap in the form of a web is left uncut nor remains in the cavity of the shaped bar.

Many other advantages, features and additional objects of the present invention will become apparent to persons skilled in the art upon making reference to the following description and the accompanying drawings which show preferred embodiments of the present invention by way of illustrative example.

PREFERRED EMBODIMENTS OF THE INVENTION

Figure 5:
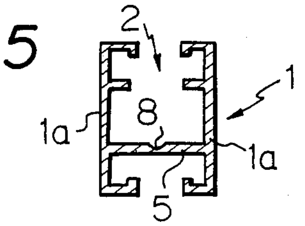
FIG. 5 is a cross sectional view of one example of a metal hollow shaped bar suitably employed in the method of the present invention.
Figure 6:
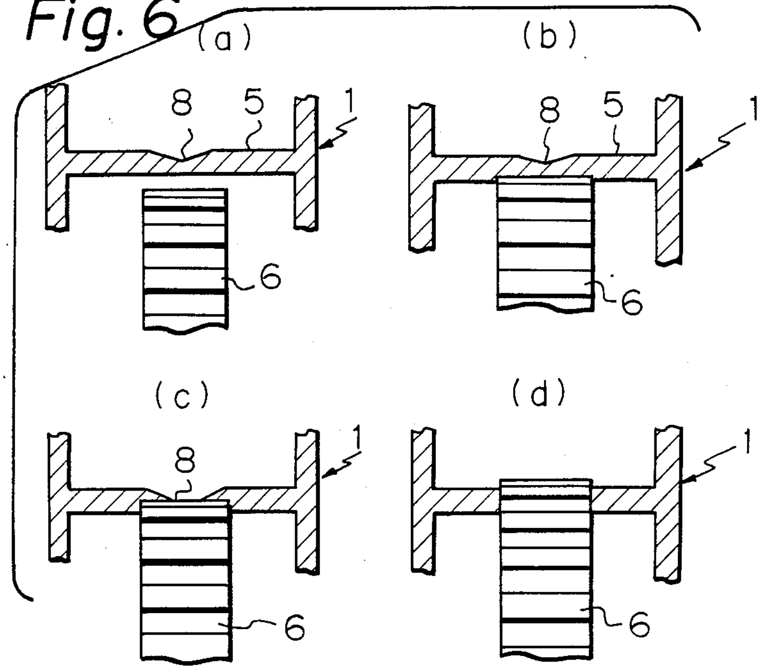
FIGS. 6(*a*) through 6(*d*) are fragmentary cross sectional views on an enlarged scale showing the cutting condition of the metal hollow shaped bar shown in FIG. 5 according to the process of the present invention.

The present invention will now be described referring to the drawings. As shown in FIG. 5, the metal shaped bar 1 employed in the present invention is similar to the conventional metal shaped bar, but the connecting wall 5 connecting a pair of side walls 1*a*, 1*a* is formed on the upper surface thereof with an inverted angular or V-shaped recess 8. As shown in FIG. 6(*a*), a rotary cutter blade 6 is positioned below the connecting wall 5, i.e. on the side opposite to the recess 8, and then brought to abut against the under surface of the connecting wall 5 to cut the portion of the connecting wall corresponding to the recess 8 as shown in FIG. 6(*b*). As shown in FIG. 6(*c*), even when the material at the central portion of the recess 8 is initially cut away, since the material on the opposite sides of the recess is thick, the material at the opposite edges of the cut off portion will not turn up inwardly and thus, the connecting wall 5 can be cut in such a manner that no scrap will remain in the obtained metal shaped bar product.

Figure 7:
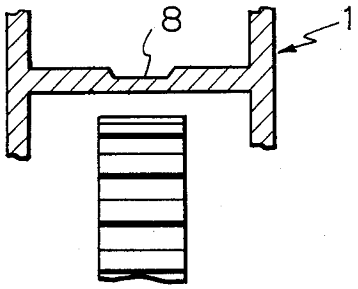
FIG. 7 is a view similar to FIG. 6(*a*) but showing another embodiment of the metal hollow shaped bar.

In the embodiment shown in FIG. 7, the recess 8 is an inverted trapezoid recess. It will be apparent to those skilled in the art that even if the recess is of an arcuate shape the material at the arcuate recess can be similarly cut off without leaving the scrap in the produced metal shaped bar product. In the embodiment shown, although the width of the recess is less than the width of the rotary cutter blade, it will also be apparent to those skilled in the art that the width of the recess may be equal to or greater than that of the cutter blade.

Figure 1:
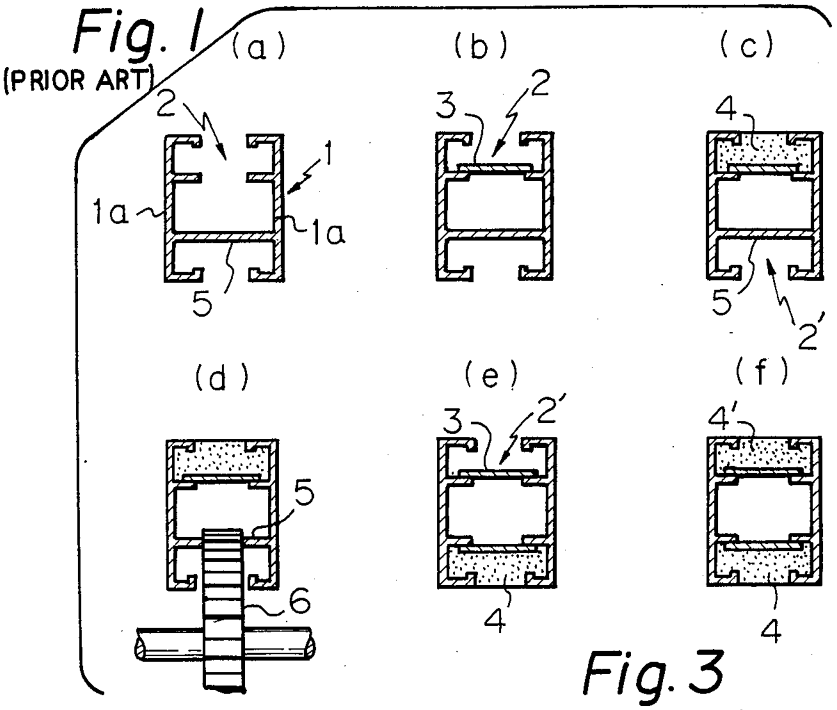
Fig. 1 (PRIOR ART)
FIGS. 1(*a*) through 1(*f*) are cross sectional views showing the successive steps in the conventional process for producing a heat insulating shaped bar by the use of a conventional hollow metal shaped bar.
Figure 2:
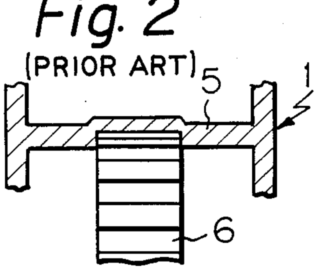
Fig. 2 (PRIOR ART)
FIG. 2 is a fragmentary cross sectional view on an enlarged scale showing a portion of the connecting wall under cutting operation.
Figure 3:
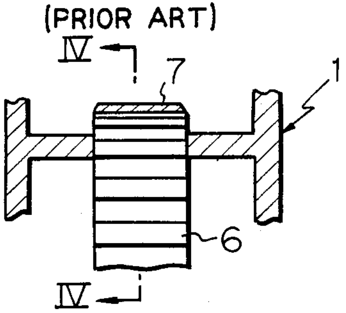
Fig. 3 (PRIOR ART)
FIG. 3 is a fragmentary cross sectional view on an enlarged scale showing the condition at the completion of the cutting of the connecting wall.
Figure 4:
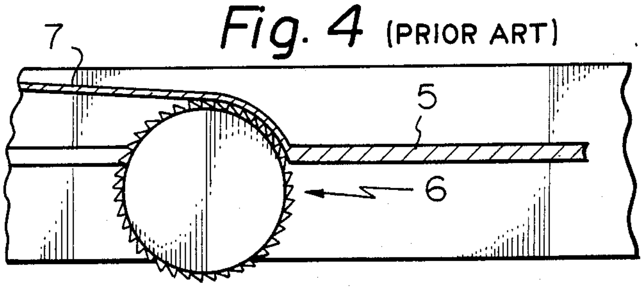
Fig. 4 (PRIOR ART)
FIG. 4 is a longitudinally sectional view taken along line IV—IV of the central area shown in FIG. 3.

Also, the shape of the heat insulating shaped bar produced by the process of the invention is not limited to the shape shown in FIGS. 1 and 5. Other embodiments which can be produced by the method of the present invention will be explained referring to FIGS. 8 to 11.

Figure 8:
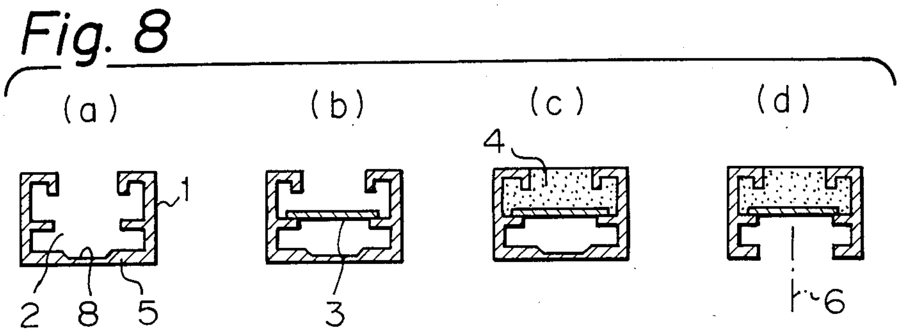
FIGS. 8*a*–8*d*, 9, 10 and 11*a*–11*d* are cross sectional views showing other embodiments of the heat insulating shaped bar produced by the process of the present invention and the successive steps for producing them.

In the embodiment shown in FIG. 8, only one groove is filled with heat insulating material 4 to provide one heat insulating connecting portion and the other groove 2 facing the connecting wall 5 is not filled with heat insulating material.

Figure 9:
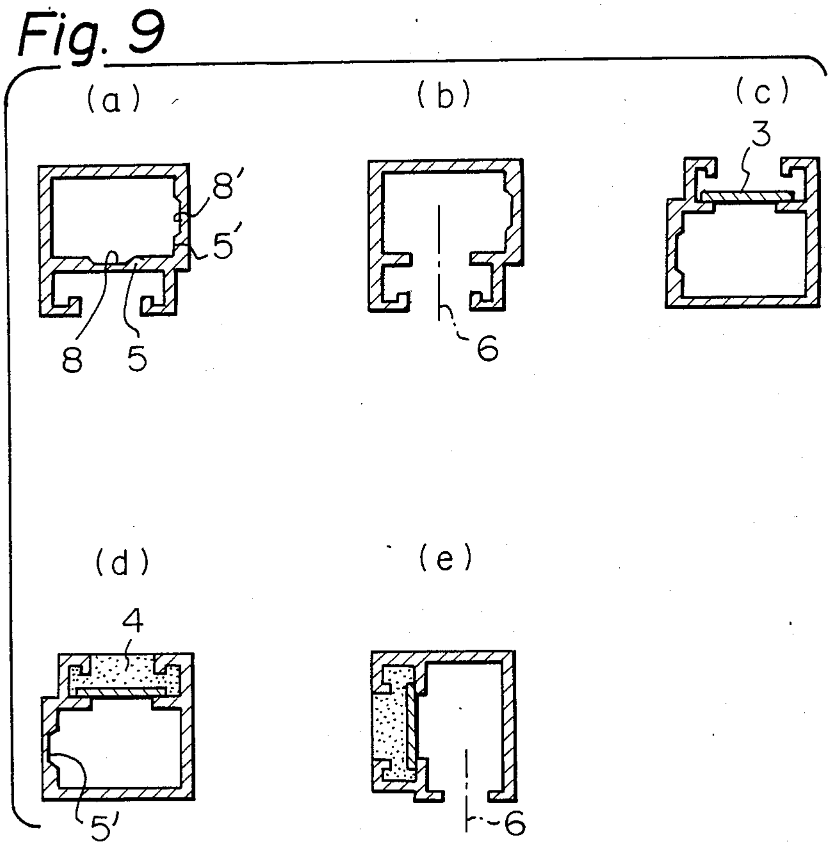

In the embodiment shown in FIG. 9, two connecting walls 5, 5' provided with the recesses 8, 8', respectively, are disposed perpendicular to each other so that they form two adjacent walls of rectangular hollow cylindrical portion of the metal shaped bar.

Figure 10:
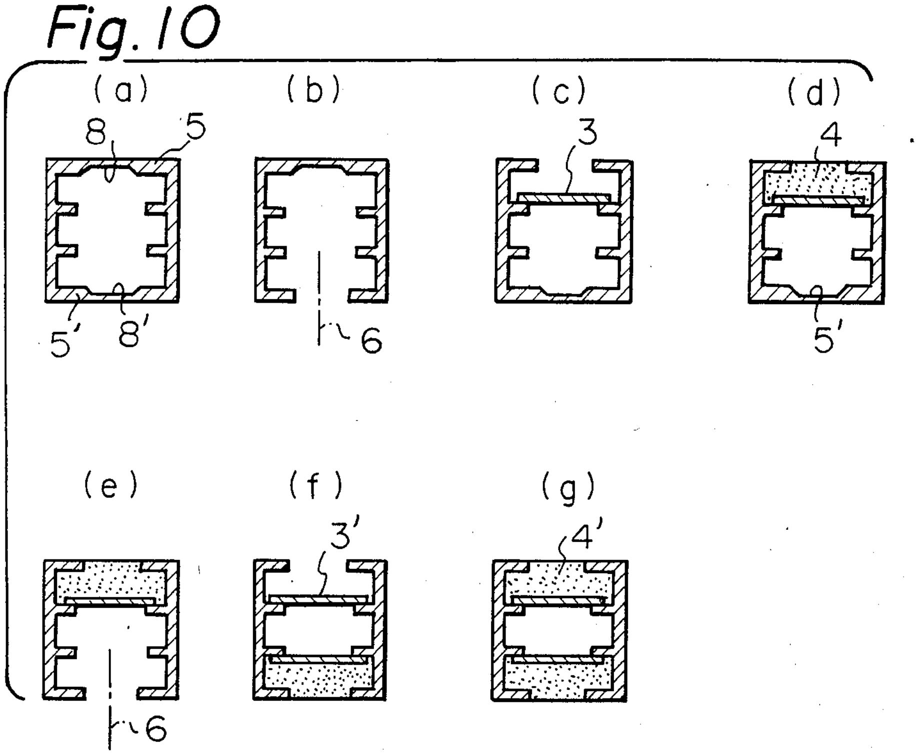

In the embodiment shown in FIG. 10, two connecting walls 5, 5' provided with the recesses 8, 8', respectively, are disposed in parallel to each other so that they form opposite top and bottom walls of the metal hollow shaped bar.

Figure 11:
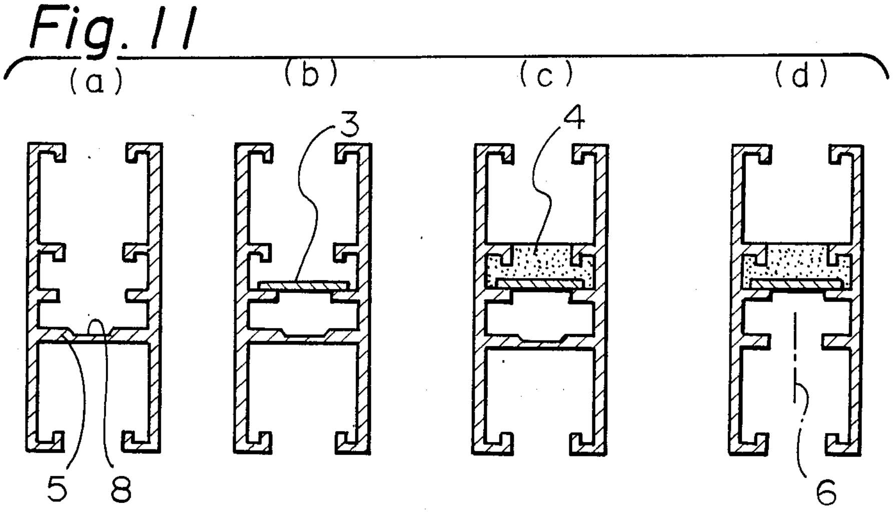

In the embodiment shown in FIG. 11, the extruded metal shaped bar has a generally H-shaped cross section and the shaped bar product includes a single heat insulating connecting portion 4 at a substantially central portion of the height thereof.

Of course, the present invention can be applied to other shapes of heat insulating shaped bar also.

Incidentally, in these FIGS. 8 to 11, the same reference numerals denote the same elements as those shown in FIGS. 1 to 7.

As mentioned hereinabove, according to the method of the present invention, a heat insulating metal shaped bar product of high efficiency can be produced having no scrap left therein.

What is claimed is:

1. In a method for manufacturing a heat insulating shaped bar comprising steps of:

(a) preparing a blank of an elongated metal shaped bar including a pair of spaced outer walls, a first interrupted partition wall extending between said outer walls so as to define a first longitudinal groove between said outer walls on one side thereof and a second continuous partition wall connecting said outer walls together so as to define a second longitudinal groove between said outer walls on the other side thereof, (b) placing a heat-insulating sheet onto the bottom of said first groove and thereafter filling said first groove with heat insulating resin, (c) forming a longitudinal gap substantially in the central portion of said second partition wall to thereby separate the same into two wall sections and (d) placing a heat-insulating sheet onto the bottom of said second groove and thereafter filling said second groove with heat insulating resin, said method is characterized in that said second partition wall includes a longitudinal recess having sloped sides substantially along its central portion on the surface thereof which faces away from said second groove, in that said longitudinal gap is formed by cutting the material of said second partition wall corresponding to said recess by a rotary cutter from one side of said second partition wall which is opposite to said recess and in that the width of said recess is less than or equal to that of said rotary cutter.

2. The method as set forth in claim 1, wherein said recess is an inverted trapezoidal recess, an arcuate recess or the like.

* * * * *